(12) United States Patent
Kim et al.

(10) Patent No.: US 11,243,569 B2
(45) Date of Patent: Feb. 8, 2022

(54) DISPLAY DEVICE

(71) Applicant: Samsung Display Co., LTD., Yongin-si (KR)

(72) Inventors: Dongkwon Kim, Asan-si (KR); Eunjung Oh, Asan-si (KR); Inwoo Jeong, Asan-si (KR); Gyunsoo Kim, Daejeon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/748,034

(22) Filed: Jan. 21, 2020

(65) Prior Publication Data
US 2020/0257336 A1 Aug. 13, 2020

(30) Foreign Application Priority Data
Feb. 12, 2019 (KR) .......................... 10-2019-0016095

(51) Int. Cl.
| G09G 5/00 | (2006.01) |
| G06F 1/16 | (2006.01) |
| G06F 3/042 | (2006.01) |
| G06F 3/044 | (2006.01) |

(52) U.S. Cl.
CPC ............ G06F 1/1643 (2013.01); G06F 3/044 (2013.01); G06F 3/0421 (2013.01)

(58) Field of Classification Search
CPC .... G06F 1/1643; G06F 3/0412; G06F 3/0416; G06F 2203/04102; H01L 27/124; H01L 27/3276; H01L 22/32

USPC .......................................... 345/76, 204, 173
See application file for complete search history.

(56) References Cited

U.S. PATENT DOCUMENTS

| 6,286,207 | B1 * | 9/2001 | Oura ................... C23C 18/1608 |
| | | | 205/126 |
| 7,528,945 | B2 | 5/2009 | Hill et al. |
| 9,572,248 | B2 | 2/2017 | Lee |
| 10,003,044 | B2 | 6/2018 | Nam et al. |
| 2007/0144771 | A1 * | 6/2007 | Chen ....................... H05K 3/361 |
| | | | 174/260 |
| 2009/0322696 | A1 * | 12/2009 | Yaakoby ................. G06F 3/041 |
| | | | 345/173 |
| 2010/0153024 | A1 | 6/2010 | Potze et al. |
| 2015/0036300 | A1 * | 2/2015 | Park ........................ H01L 27/32 |
| | | | 361/749 |
| 2017/0215288 | A1 * | 7/2017 | Shi ....................... H01L 27/3276 |
| 2017/0371194 | A1 * | 12/2017 | Tomioka ............... H01L 27/124 |
| 2017/0373125 | A1 | 12/2017 | Youk et al. |
| 2018/0096635 | A1 | 4/2018 | Park et al. |
| 2019/0206818 | A1 * | 7/2019 | Liu ........................ H01L 24/08 |

FOREIGN PATENT DOCUMENTS

| KR | 1020150033461 A | 4/2015 |
| KR | 1020160087975 A | 7/2016 |
| KR | 1020180000772 A | 1/2018 |
| KR | 1020180036304 A | 4/2018 |

* cited by examiner

*Primary Examiner* — Jennifer T Nguyen
(74) *Attorney, Agent, or Firm* — Cantor Colburn LLP

(57) ABSTRACT

A display device includes: a display panel; a circuit board disposed on a lower surface of the display panel; and an adhesive layer disposed between the circuit board and the lower surface of the display panel. An area of the circuit board that has a roughness higher than a predetermined reference roughness does not overlap the adhesive layer.

22 Claims, 5 Drawing Sheets

DISPLAY DEVICE

This application claims priority to Korean Patent Application No. 10-2019-0016095, filed on Feb. 12, 2019, and all the benefits accruing therefrom under 35 U.S.C. § 119, the disclosure of which is incorporated by reference herein in its entirety.

BACKGROUND

1. Field

Embodiments of the invention relate to a display device, and more particularly, to a display device capable of substantially minimizing image quality degradation.

2. Description of the Related Art

A flat panel display device, such as a liquid crystal display ("LCD") device or an organic light emitting diode ("OLED") display device, includes multiple pairs of electric field generating electrodes and an electro-optical active layer interposed therebetween. The LCD device includes a liquid crystal layer as the electro-optical active layer, and the OLED display device includes an organic light emitting layer as the electro-optical active layer.

In a flat panel display device, one of a pair of electric field generating electrodes is connected to a switching element to receive an electric signal, and the electro-optical active layer converts the electric signal into an optical signal to display images.

SUMMARY

One or more embodiment of the invention is directed to a display device capable of substantially minimizing image quality degradation.

According to an embodiment, a display device may include: a display panel; a circuit board disposed on a lower surface of the display panel; and an adhesive layer disposed between the circuit board and the lower surface of the display panel, wherein an area of the circuit board that has a roughness higher than a predetermined reference roughness may not overlap the adhesive layer.

The circuit board may include a plurality of signal lines, and a density of the plurality of signal lines disposed at the area of the circuit board may be higher than a predetermined reference density.

The circuit board may include a plurality of signal lines, and a pitch of the plurality of signal lines disposed at the area of the circuit board may be less than a predetermined reference pitch.

The circuit board may be electrically connected to one edge of the display panel.

The circuit board may be electrically connected to one edge of an upper surface of the display panel.

The adhesive layer may have a hole that overlaps the area.

The hole may enclose the area.

The area may include a plurality of areas separated from each other, and the adhesive layer may have a plurality of holes that overlap the plurality of areas, respectively.

The plurality of holes may enclose the areas, respectively.

The area may include a plurality of areas separated from each other, and the adhesive layer may have a hole that overlaps the plurality of areas.

The hole may enclose the areas.

The hole may have a shape substantially the same as a shape of the area.

The hole may have a shape different from a shape of the area.

The hole may have a shape of a circle, an ellipse, a rectangle, or a square.

The hole may have a planar area at least more than twice as large as the area.

The display device may further include a driving unit disposed on the circuit board.

A display device may include: a display panel; a circuit board comprising a first area having a first roughness and a second area which is different from the first area and has a second roughness, the first roughness being greater than the second roughness; and an adhesive layer which is between the circuit board and the display panel and attaches the circuit board to the display panel, wherein an outer edge of adhesive layer may be spaced apart from the first area of the circuit board.

The adhesive layer may have a recess corresponding to the first area of the circuit board, and in a plan view, the recess of the adhesive layer may be open toward a driving unit on the circuit board.

The display panel may be bendable, the circuit board may be electrically connected to the display panel at an upper surface of the display panel, the display panel which is bent disposes the adhesive layer between the circuit board and a lower surface of the display panel which is opposite to the upper surface of the display panel, to attach the circuit board to the display panel at the lower surface of the display panel, and the outer edge of adhesive layer disposed between the circuit board and the lower surface of the display panel, may be spaced apart from the first area of the circuit board.

The display device may further include a driving unit disposed on the circuit board and from which an electrical signal travels through the circuit board and to the display panel, wherein the display panel which is bent further disposes the driving unit facing the lower surface of the display panel, wherein in a plan view, the first area of the circuit board may be between the adhesive layer and the driving unit.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, where.

DETAILED DESCRIPTION

Figure 1:
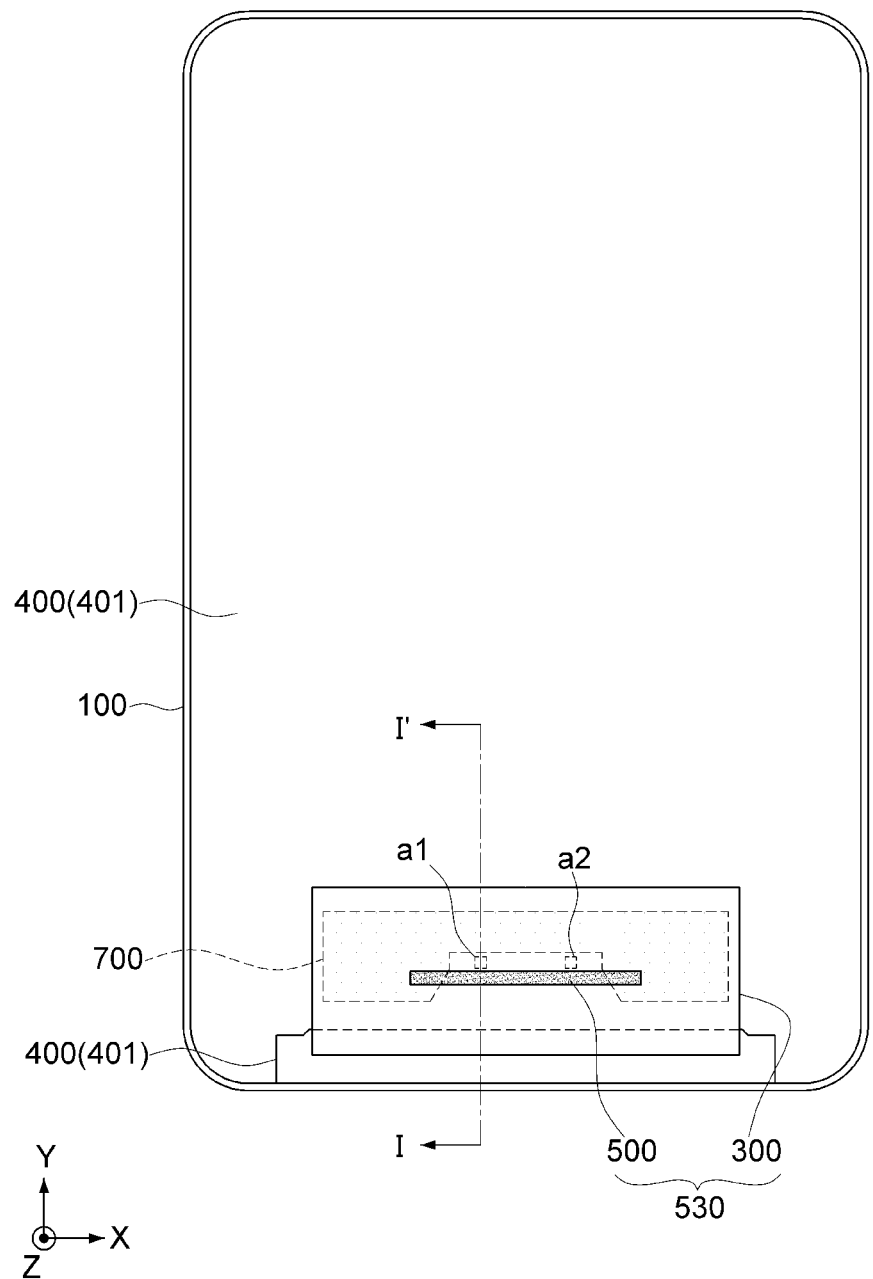
FIG. 1 is a plan view illustrating an embodiment of a display device.

Embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" or "below" another layer, area, or plate, it may be directly on the other layer, area, or plate, or intervening layers, areas, or plates may be present therebetween. Conversely, when a layer, area, or plate is referred to as being related to another element such as being "directly on" or "directly below" another layer, area, or plate, intervening layers, areas, or plates are absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "physically contacted" such as being in direct contact with the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Accordingly, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe a particular embodiment and like reference numerals refer to like elements throughout the specification.

Hereinafter, a display device will be described in detail with reference to FIGS. 1 to 9.

Figure 2:
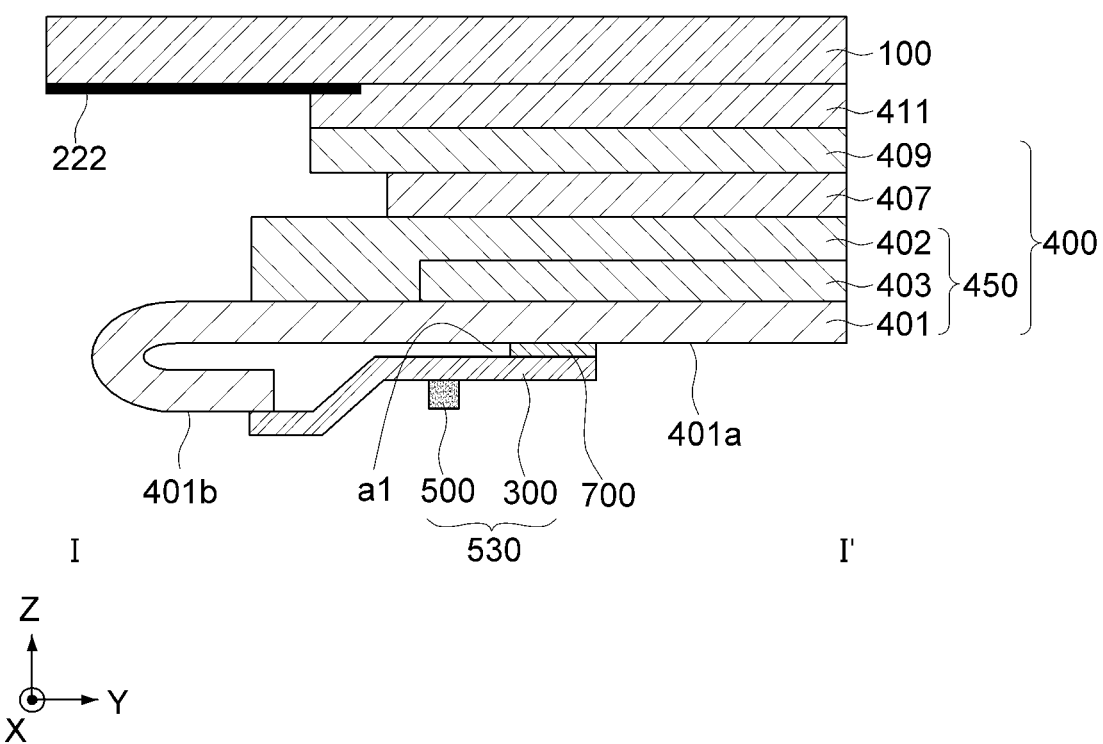
FIG. 2 is a cross-sectional view taken along line I-I' in FIG. 1.

FIG. 1 is a plan view illustrating an embodiment of a display device, and FIG. 2 is a cross-sectional view taken along line I-I' in FIG. 1. FIG. 1 illustrates a view of a lower surface (e.g., a rear side) of the display device.

As illustrated in FIGS. 1 and 2, a display device may include a display panel 400, a first adhesive layer 411, a window 100 (e.g., window layer 100), a driving circuit 530, and a second adhesive layer 700. The driving circuit 530, the second adhesive layer 700, the display panel 400, the first adhesive layer 411, and the window 100 may be disposed along a Z-axis direction, e.g., a thickness direction. The display device in FIGS. 1 and 2 is bent to dispose an end portion of the display panel 400 and components attached thereto, at a rear side of the display device (e.g., opposite to front portion or viewing side thereof).

The display panel 400 generates and/or displays images. The display panel 400 may be bendable or curvable to have a curved shape. In an embodiment, for example, the display panel 400 which is bent or curved disposes a portion of the display panel 400 facing a lower surface 401*a* of the display panel 400.

The display panel 400 may include a display element unit 450 (e.g., a display element layer 450), a touch sensing unit 407 (e.g., a touch sensing layer 407), and a polarizing plate 409.

The display element unit 450 may include a first substrate 401, a display layer 403, and a second substrate 402. The display layer 403 may be disposed on the first substrate 401, and the second substrate 402 may be disposed on the display layer 403 and the first substrate 401. In such an embodiment, the display layer 403 may be disposed between the first substrate 401 and the second substrate 402.

The first substrate 401 may be bendable or curvable to have a curved shape. In an embodiment, for example, the first substrate 401 which is bent or curved disposes a portion of the first substrate 401 to face the lower surface 401*a* of the first substrate 401 which defines the lower surface 401*a* of the display panel 400.

The display layer 403 may include an organic light emitting element. Other than the organic light emitting element, any of a number of elements with which an image is displayed and/or with which light is emitted in a display device may constitute the display layer. In an embodiment, for example, the display layer 403 may include liquid crystals instead of the aforementioned organic light emitting element. In other words, the display device according to one or more embodiment may be an OLED display device including an organic light emitting element or an LCD device including liquid crystals.

The second substrate 402 is positioned opposing the first substrate 401. The second substrate 402 may be attached to the first substrate 401 through a sealant (not illustrated). The second substrate 402 protects the display layer 403. As a material of the second substrate 402, a glass substrate or a transparent synthetic resin film including, for example, acryl may be used. In addition, a metal plate may be used as the material of the second substrate 402. In an embodiment, for example, the second substrate 402 may include at least one of a polyethylene ("PET") film, a polypropylene ("PP") film, a polyamide ("PA") film, a polyacetal ("POM") film, a polymethyl methacrylate ("PMMA") film, a polybutylene terephthalate ("PBT") film, a polycarbonate ("PC") film, a cellulose film and a moisture-proof cellophane.

The second substrate 402 may have a planar area less than a planar area of the first substrate 401. The planar area may be defined by a product of respective dimensions along a first direction and a second direction which cross each other. Referring to FIG. 1, an X-axis direction and a Y-axis direction may variously represent the first direction and the second direction, without being limited thereto. Accordingly, a partial planar area (e.g., a pad area) of the first substrate 401 may be exposed to outside the second substrate 402 without being covered by the second substrate 402. In an embodiment, the second substrate 402 may be a sealing member, and may have a thin film structure in which an organic film and an inorganic film are alternately laminated.

The touch sensing unit 407 may be disposed on the second substrate 402. The touch sensing unit 407 may correspond to a display area of the first substrate 401 at which an image is displayed by the display panel 400. Although not illustrated, the touch sensing unit 407 may include a plurality of first electrodes and a plurality of second electrodes which cross each other. The first and second electrodes may include a touch sensor pattern. In an embodiment, the first and second electrodes may be directly provided or directly patterned on the second substrate 402 in a matrix form (e.g., in an on-cell method). Such an on-cell method may be applied when the second substrate 402 is used as a sealing member. In an embodiment, for example, when the display device is an OLED display device, the second substrate 402 may be used as a sealing member.

In an embodiment, the touch sensing unit 407 may be a touch panel that is separately manufactured or provided separately from the display panel 400, and subsequently provided on the display panel 400. In such an embodiment, the touch sensing unit 407 may be disposed on the second substrate 402. Such a separately manufactured touch panel method may be applied when patterns are already disposed at one surface of the second substrate 402. In an embodiment, for example, where the display device is an LCD device, the patterns such as a black matrix and a color filter may be already disposed at one surface of the second substrate 402 and the touch sensing unit 407 may be subsequently provided on the second substrate 402.

The touch sensing unit 407 recognizes a touch as an input from outside the touch sensing unit 407, by an input tool or touch means, e.g., a pen or a user's body part such as a finger, and transmits a signal corresponding to a position where the touch is input to a touch controller (not illustrated) of the display device. The touch sensing unit 407 may be used as an input means for the display device. The touch sensing unit 407 may recognize the touch in a resistive manner or a capacitive manner.

The polarizing plate 409 may be disposed on the touch sensing unit 407. In an embodiment, for example, the polarizing plate 409 may be disposed between the touch sensing unit 407 and the first adhesive layer 411. The polarizing plate 409 may substantially reduce or effectively prevent reflection of external light incident to thereto from outside of the display device.

The first adhesive layer 411 may be disposed between the display panel 400 and the window 100. In an embodiment, for example, the first adhesive layer 411 may be disposed between the polarizing plate 409 of the display panel 400 and the window 100. The first adhesive layer 411 may attach the display panel 400 and the window 100 to each other. In addition, the first adhesive layer 411 may improve luminance, transmittance, reflectance and visibility of the display device. The first adhesive layer 411 may include a resin. This resin may be a photo-curable resin.

The window 100 may be disposed on the first adhesive layer 411 so as to overlap the display panel 400. The window 100 may include a light-transmissive area overlapping a display area of the display panel 400 at which an image is displayed, and a light blocking area overlapping a non-display area of the display panel 400 at which the image is not displayed. The window 100 may for an external surface of the display device at a viewing side thereof, without being limited thereto. A light blocking portion 222 may be disposed at the light blocking area of the window 100. In an embodiment, for example, the light blocking portion 222 may be disposed along an edge or edge portion of a lower surface of the window 100. In such an embodiment, the light-transmissive area of the window 100 is enclosed by the light blocking portion 222 in the top plan view. The window 100 may include a transparent material such as a glass material.

The driving circuit 530 drives the display panel 400. The driving circuit 530 may be connected to the display panel 400. In an embodiment, for example, the driving circuit 530 may be electrically connected to the first substrate 401 of the display panel 400. As a more specific example, the driving circuit may be electrically connected to an upper surface 401b of the first substrate 401 which is opposite to the lower surface 401a thereof.

The driving circuit 530 may include a circuit board 300 and a driving unit 500 (e.g., driver or driving member).

The circuit board 300 may be electrically connected to the first substrate 401 of the display panel 400. The circuit board 300 may be a film including a plurality of signal lines through which various electrical signals (e.g., a driving signal, a control signal, a power signal, a gate signal, a data signal, etc.) are transmitted to the display panel 400 from the driving unit 500. In such an embodiment, the film may be a bendable film, for example, a flexible film.

The driving unit 500 drives the display panel 400. In an embodiment, for example, the driving unit 500 may provide electrical signals (e.g., gate signals and data signals) to the display panel 400 to respectively drive gate lines and data lines of the first substrate 401. The driving unit 500 is disposed on the circuit board 300. In an embodiment, for example, the driving unit 500 may be mounted at a mounting area of the circuit board 300. The driving unit 500 may include an integrated circuit. The driving unit 500 may have a bar shape in a top plan view, the bar shape defining a length of the driving unit 500 which extends along the X-axis direction.

The second adhesive layer 700 may be disposed on the lower surface 401a of the display panel 400. In an embodiment, for example, the second adhesive layer 700 may be disposed on the lower surface 401a of the first substrate 401 of the display panel 400. As a more specific example, the second adhesive layer 700 may be disposed between the driving circuit 530 and the display panel 400. In an embodiment, for example, the second adhesive layer 700 may be disposed between the circuit board 300 and the lower surface 401a of the first substrate 401. The second adhesive layer 700 may be, for example, a pressure sensitive adhesive ("PSA").

The second adhesive layer 700 overlaps (e.g., corresponds to) the display area of the display panel 400. The circuit board 300 may be attached to the lower surface 401a of the first substrate 401 by the second adhesive layer 700. The display panel 400 which is bent disposes the second adhesive layer 700 between the circuit board 300 and the lower surface 401a of the display panel 400, to attach the circuit board 300 to the display panel 400 at the lower surface 401a thereof. In such an embodiment, the second adhesive layer 700 does not overlap a certain area of the circuit board 300, which will be described in detail with reference to FIG. 3.

Figure 3:
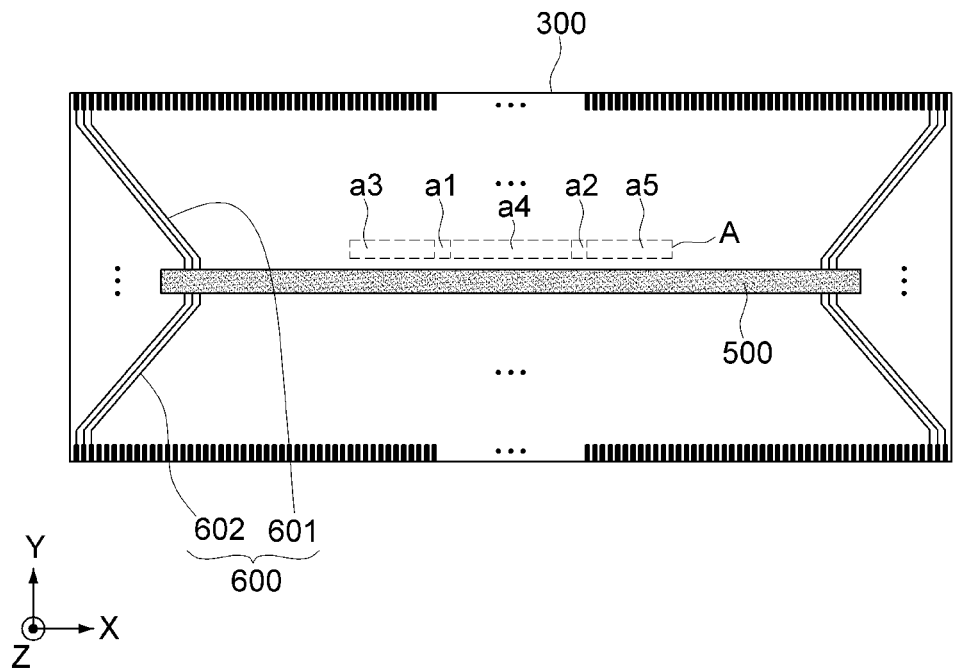
FIG. 3 is a plan view illustrating an embodiment of a driving circuit of FIG. 1.
Figure 4:
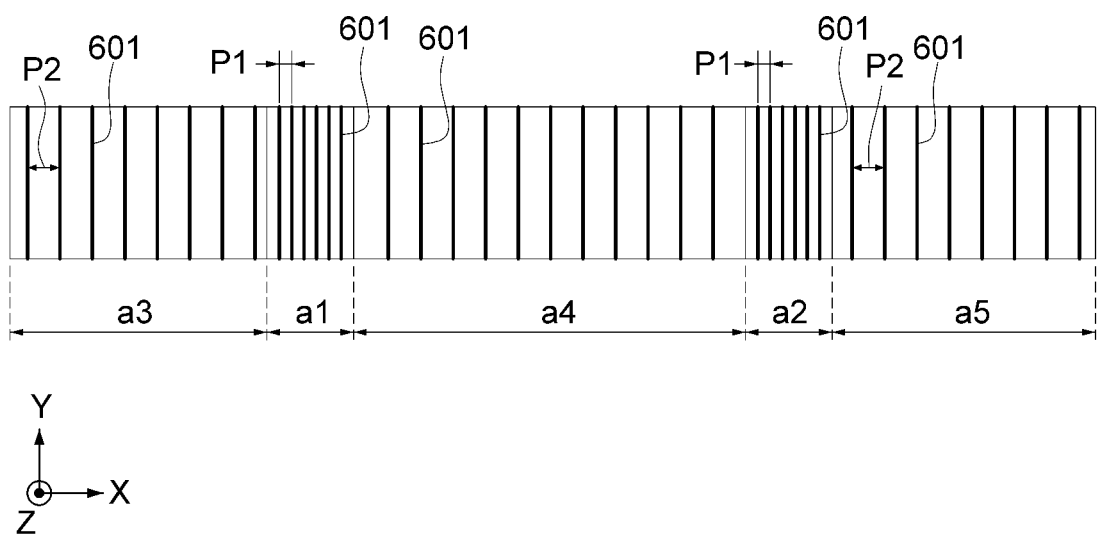
FIG. 4 is an enlarged plan view of portion A in FIG. 3.
Figure 5:
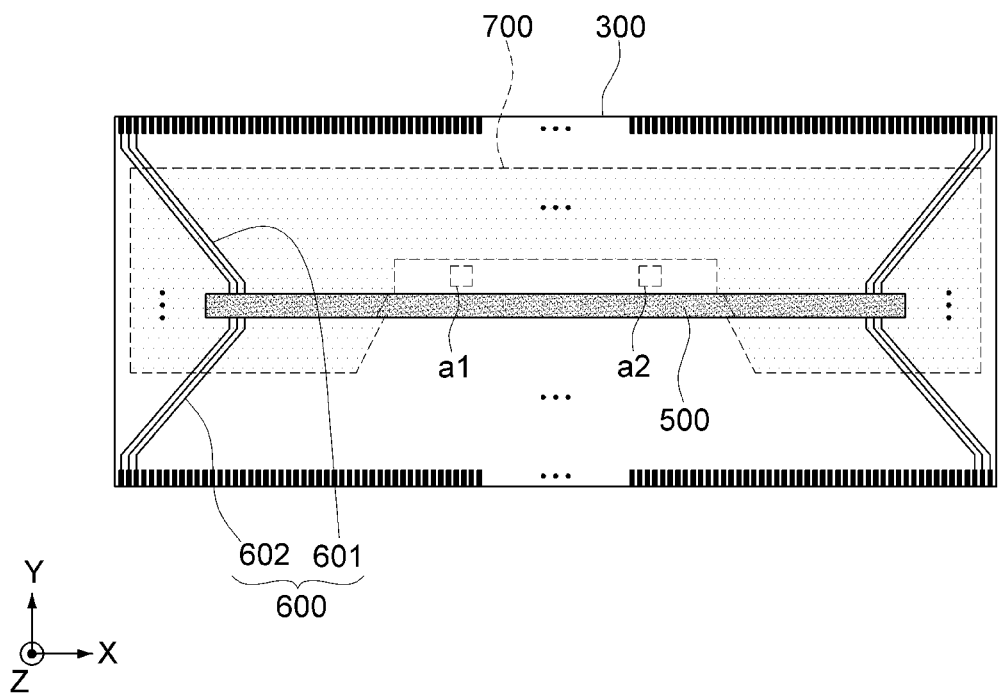
FIG. 5 is a plan view illustrating an embodiment of a second adhesive layer relative to a driving circuit of FIG. 1.

FIG. 3 is a plan view illustrating an embodiment of the driving circuit 530 of FIG. 1, FIG. 4 is an enlarged plan view of portion A in FIG. 3, and FIG. 5 is a plan view illustrating an embodiment of the second adhesive layer 700 relative to the driving circuit 530 of FIG. 1.

The circuit board 300 of the driving circuit 530 may include a plurality of signal lines 600, as illustrated in FIG. 3.

The driving unit 500 of the driving circuit 530 is disposed at the mounting area of the circuit board 300. The mounting area of the circuit board 300 may be located at a center portion of the circuit board 300.

The plurality of signal lines 600 may include a first signal line 601 provided in plurality (e.g., a plurality of first signal lines 601) and a second signal line 602 provided in plurality (e.g., a plurality of second signal lines 602).

The plurality of first signal lines 601 and the plurality of second signal lines 602 are connected to the driving unit 500. In an embodiment, for example, the plurality of first signal lines 601 may be connected to a plurality of first terminals of the driving unit 500, respectively, and the plurality of second signal lines 602 may be connected to a plurality of second terminals of the driving unit 500, respectively.

A first end portion of each of the plurality of first signal lines 601 may be disposed at a first pad area of the circuit board 300. Referring to FIG. 3, for example, such first end portion of the first signal line 601 may have a planar area larger than a planar area of another portion of the first signal line 601 such as a remaining portion of the first signal line 601 and/or a portion of the first signal line 601 which is adjacent to the first end portion.

A first end portion of each of the plurality of second signal lines 602 may be disposed at a second pad area of the circuit board 300. Such second end portion of the second signal line 602 may have a planar area larger than a planar area of another portion of the second signal line 602 such as a remaining portion of the second signal line 602 and/or a portion of the second signal line 602 which is adjacent to the first end portion. A first end portion of a second signal line 602 and a first end portion of a first signal line 601 face each other along the Y-axis direction.

Although not illustrated, the first end portion of each of the plurality of first signal lines 601 may be connected to another circuit board (e.g., a printed circuit board). Another driving unit (hereinafter, "a second driving unit") may be disposed on the printed circuit board. Electrical signals from the second driving unit may be applied to the driving unit 500 through the first signal lines 601.

In an embodiment, an interval between the signal lines 600 disposed at a specific area (e.g., areas a1 and a2) of the circuit board 300 may be less than a predetermined reference interval. In such an embodiment, the interval between the signal lines 600 may be defined as a line pitch. The line pitch of the specific area being less than the predetermined reference pitch means an interval between signal lines 600 which are adjacent to each other and disposed at the specific area, is less than the reference interval.

In an embodiment, for example, each of a line pitch P1 within the first area a1 and within the second area a2 in FIG. 4 may be less than the aforementioned reference value. Accordingly, a density of the first signal lines 601 within the first area a1 and a density of the first signal lines 601 within the second area a2 are both greater than a reference density. Accordingly, each of a roughness (e.g., surface roughness) within the first area a1 and a roughness within the second area a2 is higher than a predetermined reference roughness. In such an embodiment, the reference roughness may be, for example, substantially equal to or greater than about 0.2 a (i.e. 0.2 Ra) micrometers (μm) and substantially equal to or less than about 6.3 a (i.e. 6.3 Ra) μm.

Accordingly, more wrinkles may be generated at the first area a1 and the second area a2 of the circuit board 300, as compared to other areas of the circuit board 300. Since more wrinkles may be generated at the first area a1 and the second area a2 of the circuit board 300 owing to the increased density of the signal lines 600, if the second adhesive layer 700 is disposed at the first area a1 and the second area a2, a surface of the second adhesive layer 700 that contacts the first area a1 and the second area a2 may be wrinkled.

Where the surface of the second adhesive layer 700 that contacts the first area a1 and the second area a2 is wrinkled, a surface of the first substrate 401 that contacts the second adhesive layer 700 may also be wrinkled. Since the second adhesive layer 700 corresponds to the display area of the display panel 400, the wrinkle of the first substrate 401 may affect images at the display area. In an embodiment, for example, the image visible at the display area from outside the display device may be distorted due to the wrinkles in the first substrate 401. In order to address such an issue, in one or more embodiment, the second adhesive layer 700 does not overlap the first area a1 and the second area a2 described above, as illustrated in FIG. 5. Accordingly, the wrinkles of the circuit board 300 do not propagate to the display area of the display panel 400 such that the display quality of an image at the display area is improved.

Referring to FIG. 5, the second adhesive layer 700 may have an overall rectangular shape in the plan view. A recess may be defined at one side of the second adhesive layer 700. The recess may be open in a direction towards the first area a1 and the second area a2 such that the second adhesive layer 700 does not correspond to the first area a1 and the second area a2. That is, an outer edge of the second adhesive layer 700 at the recess may be adjacent to or spaced apart from a boundary of the first area a1 and the second area a2, such that the second adhesive layer 700 does not correspond to (e.g., does not overlap with) the first area a1 and the second area a2.

In an embodiment, as illustrated in FIG. 4, each of a line pitch P2 within a third area a3 of the circuit board 300, a line pitch P2 within a fourth area a4 of the circuit board 300, and a line pitch P2 within a fifth area a5 of the circuit board 300 may be greater than the aforementioned reference pitch. Accordingly, since the density of the first signal lines 601 within the third, fourth and fifth areas a3, a4 and a5 of the circuit board 300 is less than the reference density, roughness within each of the third, fourth and fifth areas a3, a4 and a5 is lower than the aforementioned reference roughness. That is, the first area a1 and the second area a2 (e.g., together a collective "first area") have a first roughness and the third, fourth and fifth areas a3, a4 and a5 (e.g., together a collective "second area which is different from the first area") have a second roughness, the first roughness being greater than the second roughness.

Where the surface of the second adhesive layer 700 contacts the third, fourth and/or fifth areas a3, a4 and a5 which each have a roughness which is lower than the aforementioned reference roughness, the second adhesive layer 700 may not be wrinkled, and consequently, a surface of the first substrate 401 that contacts the second adhesive layer 700 may also not be wrinkled. Accordingly, substantially no wrinkles may be generated in the third, fourth and fifth areas a3, a4 and a5, and the image visible at the display area from outside the display device may not be distorted due to the wrinkles in the first substrate 401.

In an embodiment, the recess in the second adhesive layer 700 may correspond to one or more among the third, fourth and fifth areas a3, a4 and a5, in addition to the first area a1 and the second area a2. In another embodiment, portions of the second adhesive layer 700 may correspond to one or more among the third, fourth and fifth areas a3, a4 and a5, while not corresponding to the first area a1 and the second area a2.

While the first area a1 and the second area a2 in FIG. 5 are shown to have a rectilinear shape in the plan view, the invention is not limited thereto. In an embodiment, although not illustrated, at least one of the first area a1 and the second area a2 may have a circular shape or an elliptical shape in the plan view.

Figure 6:
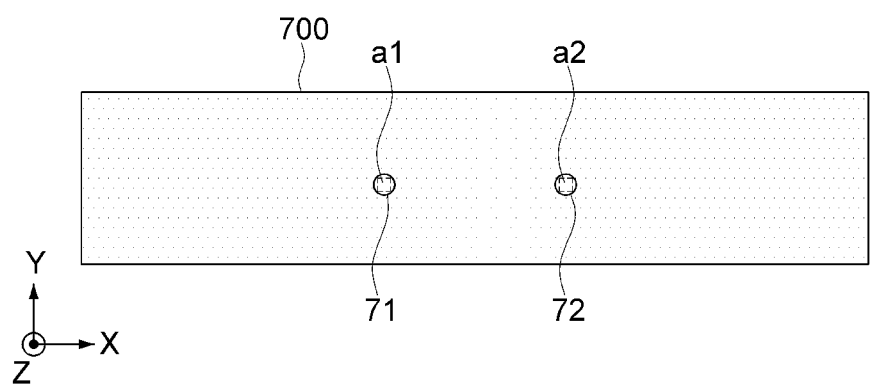
FIG. 6 is a plan view illustrating another embodiment of a second adhesive layer.

FIG. 6 is a plan view illustrating another embodiment of a second adhesive layer 700.

A second adhesive layer 700 may have a first hole 71 and a second hole 72 defined therein, as illustrated in FIG. 6. The first and second holes 71 and 72 may be defined through the second adhesive layer 700 along the Z-axis direction.

The first hole 71 may be located corresponding to the first area a1 of the circuit board 300 described above. The first hole 71 may overlap the first area a1. In such an embodiment, the first hole 71 may enclose the first area a1. In an embodiment, for example, the first hole 71 may have a closed shape (or a closed loop shape) enclosing the first area a1. The first hole 71 may have a planar area substantially equal to or larger than a planar area of the first area a1. Referring to FIG. 6, for example, the planar shape of the first area a1 is completely within the closed planar shape of the first hole 71, such that the first hole 71 encloses the first area a1.

The second hole 72 may be located corresponding to the second area a2 of the circuit board 300 described above. The second hole 72 may overlap the second area a2. In such an embodiment, the second hole 72 may enclose the second area a2. In an embodiment, for example, the second hole 72 may have a closed shape enclosing the second area a2. The second hole 72 may have a planar area substantially equal to or larger than a planar area of the second area a2.

Each of the first hole 71 and the second hole 72 may have a circular shape in the plan view. In addition, although not illustrated, each of the first hole 71 and the second hole 72 may have an elliptical shape in the plan view. The first hole 71 and the second hole 72 may each be a discrete opening defined by portions of the second adhesive layer 700.

Figure 7:
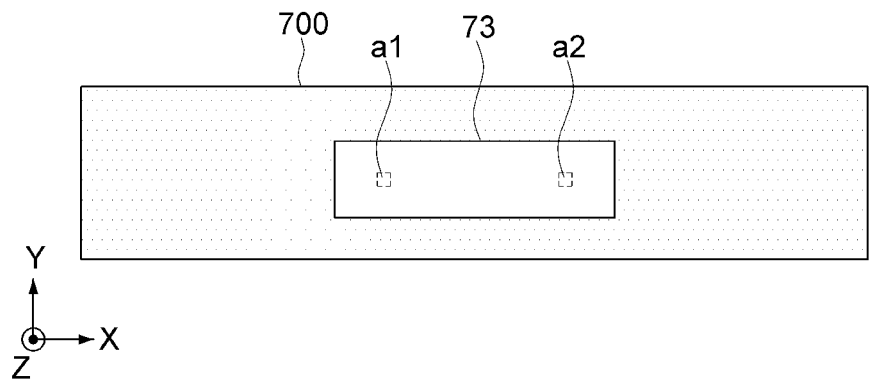
FIG. 7 is a plan view illustrating still another embodiment of a second adhesive layer.

FIG. 7 is a plan view illustrating still another embodiment of a second adhesive layer 700.

A second adhesive layer 700 may have a hole 73 defined therein, as illustrated in FIG. 7. The hole 73 may be defined through the second adhesive layer 700 along the Z-axis direction.

The hole 73 may be a discrete opening defined by portions of the second adhesive layer 700. The hole 73 as a single discrete opening may be located corresponding to each of the first area a1 and the second area a2 of the circuit board 300 described above. The hole 73 overlaps each of the first area a1 and the second area a2. In such an embodiment, the hole 73 may enclose the first area a1 and the second area a2. In an embodiment, for example, a same one of the hole 73 may have a closed shape enclosing both the first area a1 and the second area a2. The hole 73 may have a planar area larger than a total planar area of the first area a1 and the second area a2.

The hole 73 may have a quadrangular shape (e.g., a rectangular shape). In addition, although not illustrated, the hole 73 may have a square shape. In such an embodiment, the hole 73 may have a shape substantially the same as a shape of the first area a1 or a shape of the second area a2.

Figure 8:
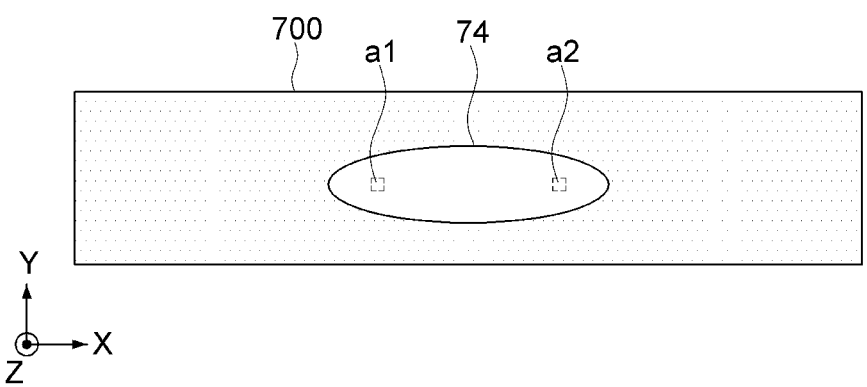
FIG. 8 is a plan view illustrating a modified embodiment of a second adhesive layer.

FIG. 8 is a plan view illustrating a modified embodiment of a second adhesive layer 700.

A second adhesive layer 700 may have a hole 74 defined therein, as illustrated in FIG. 8. The hole 74 may be defined through the second adhesive layer 700 along the Z-axis direction.

The hole 74 may be a discrete opening defined by portions of the second adhesive layer 700. The hole 74 as a single discrete opening may be located corresponding to each of the first area a1 and the second area a2 of the circuit board 300 described above. The hole 74 overlaps each of the first area a1 and the second area a2. In such an embodiment, the hole 74 may enclose the first area a1 and the second area a2. In an embodiment, for example, a same one of the hole 74 may have a closed shape enclosing both the first area a1 and the second area a2. The hole 74 may have a planar area larger than a total planar area of the first area a1 and the second area a2.

The hole 74 may have an elliptical shape. In addition, although not illustrated, the hole 74 may have a circular shape. Referring to FIG. 8, the hole 74 defined in the second adhesive layer 700 has a different shape from a shape of the first area a1.

Figure 9:
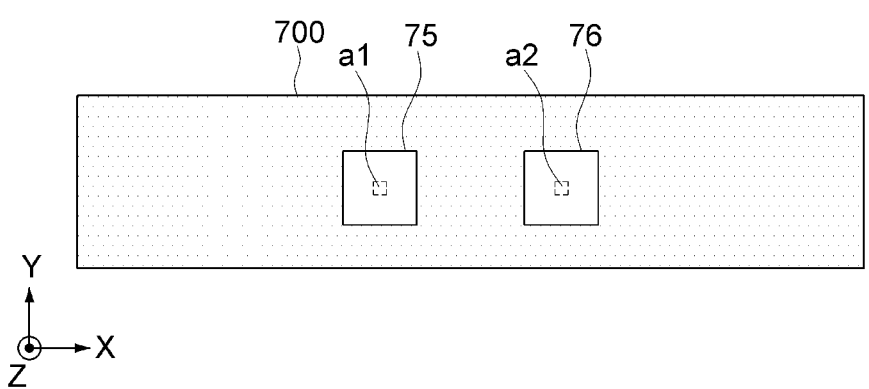
FIG. 9 is a plan view illustrating yet another embodiment of a second adhesive layer.

FIG. 9 is a plan view illustrating yet another embodiment of a second adhesive layer 700.

A second adhesive layer 700 may have a first hole 75 and a second hole 76 defined in the second adhesive layer 700, as illustrated in FIG. 9. The first and second holes 75 and 76 may be defined through the second adhesive layer 700 along the Z-axis direction. The first and second holes 75 and 76 may each be a discrete opening defined by portions of the second adhesive layer 700.

The first hole 75 may be located corresponding to the first area a1 of the circuit board 300 described above. The first hole 75 may overlap the first area a1. In such an embodiment, the first hole 75 may enclose the first area a1. In an embodiment, for example, the first hole 75 may have a closed shape enclosing the first area a1. The first hole 75 may have a planar area larger than a planar area of the first area a1. In an embodiment, for example, the first hole 75 may have a planar area more than twice as large as a planar area of the first area a1.

The second hole 76 may be located corresponding to the second area a2 of the circuit board 300 described above. The second hole 76 may overlap the second area a2. In such an embodiment, the second hole 76 may enclose the second area a2. In an embodiment, for example, the second hole 76 may have a closed shape enclosing the second area a2. The second hole 76 may have a planar area larger than a planar area of the second area a2. In an embodiment, for example, the second hole 76 may have a planar area more than twice as large as a planar area of the second area a2.

Each of the first hole 75 and the second hole 76 may have a square shape. In another embodiment, although not illustrated, each of the first hole 75 and the second hole 76 may have a quadrangular shape (e.g., a rectangular shape). In such an embodiment, the first hole 75 may have a shape substantially the same as a shape of the first area a1, and the second hole 76 may have a shape substantially the same as a shape of the second area a2.

As set forth hereinabove, a display device according to one or more embodiments may substantially minimize degradation of image quality.

While the invention has been illustrated and described with reference to the embodiments thereof, it will be apparent to those of ordinary skill in the art that various changes in form and detail may be made thereto without departing from the spirit and scope of the invention.

What is claimed is:

1. A display device comprising:
   a display panel;
   a circuit board disposed on a lower surface of the display panel, the circuit board comprising a reference area having a references roughness and an area which is different from the reference area and has a roughness higher than the reference roughness; and
   an adhesive layer disposed between the circuit board and the lower surface of the display panel,
   wherein the area of the circuit board having the roughness higher than the reference roughness does not overlap the adhesive layer.

2. The display device of claim 1, wherein
   the circuit board comprises a plurality of signal lines,
   each of the reference area and the area of the circuit board has a density of signal lines, and
   the density of signal lines at the area of the circuit board is higher than the density of signal lines at the reference area.

3. The display device of claim 1, wherein
   the circuit board comprises a plurality of signal lines,
   each of the reference area and the area of the circuit board has a pitch between signal lines, and
   the pitch between signal lines at the area of the circuit board is less than the pitch between signal lines at the reference area.

4. The display device of claim 1, wherein the circuit board is electrically connected to one edge of the display panel.

5. The display device of claim 4, wherein the circuit board is electrically connected to one edge of an upper surface of the display panel.

6. The display device of claim 1, wherein the adhesive layer has a hole that overlaps the area.

7. The display device of claim 6, wherein the hole encloses the area.

8. The display device of claim 6, wherein the hole has a shape substantially the same as a shape of the area.

9. The display device of claim 6, wherein the hole has a shape different from a shape of the area.

10. The display device of claim 6, wherein the hole has a shape of a circle, an ellipse, a rectangle, or a square.

11. The display device of claim 6, wherein the hole has a planar area at least more than twice as large as the area.

12. The display device of claim 1, wherein the area includes a plurality of areas separated from each other, and
    the adhesive layer has a plurality of holes that overlap the plurality of areas, respectively.

13. The display device of claim 12, wherein the plurality of holes enclose the areas, respectively.

14. The display device of claim 1, wherein the area includes a plurality of areas separated from each other, and
    the adhesive layer has a hole that overlaps the plurality of areas.

15. The display device of claim 14, wherein the hole encloses the areas.

16. The display device of claim 1, further comprising a driving unit disposed on the circuit board.

17. A display device comprising:
    a display panel;
    a circuit board comprising a first area having a first roughness and a second area which is different from the first area and has a second roughness, the first roughness being greater than the second roughness; and
    an adhesive layer which is between the circuit board and the display panel and attaches the circuit board to the display panel,
    wherein an outer edge of the adhesive layer is spaced apart from the first area of the circuit board.

18. The display device of claim 17, wherein
    the adhesive layer has a recess corresponding to the first area of the circuit board, and
    in a plan view, the recess of the adhesive layer is open toward a driving unit on the circuit board.

19. The display device of claim 17, wherein
    the display panel is bendable,
    the circuit board is electrically connected to the display panel at an upper surface of the display panel,
    the display panel which is bent disposes the adhesive layer between the circuit board and a lower surface of the display panel which is opposite to the upper surface of the display panel, to attach the circuit board to the display panel at the lower surface of the display panel, and
    the outer edge of the adhesive layer disposed between the circuit board and the lower surface of the display panel, is spaced apart from the first area of the circuit board.

20. The display device of claim 19, further comprising a driving unit disposed on the circuit board and from which an electrical signal travels through the circuit board and to the display panel,
    wherein the display panel which is bent further disposes the driving unit facing the lower surface of the display panel,
    wherein in a plan view, the first area of the circuit board is between the adhesive layer and the driving unit.

21. The display device of claim 17, wherein the outer edge of the adhesive layer is spaced apart from the first area of the circuit board in the top plan view or in a direction along the circuit board.

22. The display device of claim 21, wherein the outer edge of the adhesive layer is closest to the first area of the circuit board.

\* \* \* \* \*